(12) United States Patent
Yang

(10) Patent No.: US 8,872,430 B2
(45) Date of Patent: Oct. 28, 2014

(54) LED DRIVE CIRCUIT

(75) Inventor: Xiang Yang, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 247 days.

(21) Appl. No.: 13/379,504

(22) PCT Filed: Nov. 17, 2011

(86) PCT No.: PCT/CN2011/082321
§ 371 (c)(1),
(2), (4) Date: Dec. 20, 2011

(87) PCT Pub. No.: WO2013/010360
PCT Pub. Date: Jan. 24, 2013

(65) Prior Publication Data
US 2013/0127348 A1    May 23, 2013

(51) Int. Cl.
*H05B 33/08* (2006.01)
(52) U.S. Cl.
CPC ........... *H05B 33/0809* (2013.01); *Y02B 20/348* (2013.01); *H05B 33/0821* (2013.01); *Y02B 20/346* (2013.01)
USPC .......................................... 315/122; 315/121
(58) Field of Classification Search
CPC ........... H05B 33/0809; H05B 33/0815; H05B 33/0803; H05B 33/0821; H05B 33/0827; H05B 37/0263; H05B 41/3921; H05B 41/3925; H05B 41/2821; H05B 41/2881; H05B 33/0824; H05B 33/0851; H05B 33/089

USPC ......................................... 315/186; 363/21.02
See application file for complete search history.

(56) References Cited

U.S. PATENT DOCUMENTS

| 7,573,729 B2 * | 8/2009 | Elferich et al. ............ 363/21.02 |
| 2010/0244737 A1* | 9/2010 | Madhani et al. .............. 315/297 |
| 2012/0146526 A1* | 6/2012 | Lam et al. .................. 315/200 R |

FOREIGN PATENT DOCUMENTS

CN            101621877 A        1/2010

OTHER PUBLICATIONS

International Search Report for PCT/CN2011/082321.

* cited by examiner

*Primary Examiner* — Douglas W Owens
*Assistant Examiner* — Monica C King

(57) ABSTRACT

An LED drive circuit is disclosed, which comprises a square wave generator configured to generate a square-wave signal for driving an LED unit, an LLC resonance circuit configured to transform the square-wave signal outputted by the square wave generator into a sinuous wave of a reduced voltage level, and the LED unit comprising at least one LED sub-unit. The LED sub-unit comprises at least a first LED lamp set and a second LED lamp set connected in parallel, and LEDs of the first LED lamp set are disposed in a direction opposite to those of the second LED lamp set. The square wave generator, the LLC resonance circuit and the LED unit are connected in sequence. The LED drive circuit of the present disclosure can drive an LED and has a reduced cost.

16 Claims, 6 Drawing Sheets

LED DRIVE CIRCUIT

BACKGROUND

1. Technical Field

The present disclosure relates to the field of liquid crystal displaying, and more particularly, to a light emitting diode (LED) drive circuit.

2. Description of Related Art

In conventional liquid crystal displays (LCDs), alternating current (AC) power must be transformed into direct current (DC) power for driving LEDs. A prior art LED drive circuit is as shown in FIG. 1. The LED drive circuit comprises a square wave generator 100, an LLC resonance circuit 200, a rectifying circuit 300, a boost circuit 400 and an LED unit 500. The square wave generator 100 may be a half-bridge inverter or a full-bridge inverter. Taking a half-bridge inverter as an example, the half-bridge inverter comprises a half-bridge drive integrated circuit (IC) 10, and two switches S1, S2 (diodes or field effect transistors (FETs)) connected in series. The two switches S1, S2 are turned on or off alternately, and drive signals thereof are complementary signals having a certain duty ratio. An LLC resonance circuit 200 is formed by a serial resonance inductor Ls, a serial resonance capacitor Cs and a transformer. Because the LLC resonance circuit 200 is connected at a middle point of the half-bridge, the serial resonance capacitor Cs also serves the function of blocking the DC current. The transformer comprises an inductor Lm acting as a primary winding and inductors L1 and L2 acting as secondary windings. At the secondary side of the transformer, a rectifying circuit 300 having a center tap is formed by rectifying diodes D11 and D26. A square-wave voltage outputted by the square wave generator 100 is modulated by the LLC resonance circuit 200 and the rectifying circuit 300 into a square-wave voltage of a reduced level. The reduced square-wave voltage signal is then boosted by the boost circuit 400 into a voltage necessary for the LED unit 500. The boost circuit 400 comprises an inductor L3, a diode D12 and a switch S3 (e.g., an FET). The diode D12 has an input terminal connected to the inductor L3 and an output terminal connected to the LED unit 500. The switch S3 has a terminal connected to a middle point between the inductor L3 and the diode D12 and a terminal connected to the ground. The switch S3 is controlled by a pulse voltage (i.e., PWM) to boost the DC signal outputted by the rectifying circuit 300 into a voltage shown for powering the LED unit 500. As the LED drive circuit shown in FIG. 1 comprises the square wave generator 100, the LLC resonance circuit 200, the rectifying circuit 200, the boost circuit 400 and the LED unit 500 at the same time, the cost is high and the efficiency is low.

BRIEF SUMMARY

The primary objective of the present disclosure is to provide an LED drive circuit which can drive an LED and has a reduced cost.

To achieve the aforesaid objective, the present disclosure provides an LED drive circuit. The LED drive circuit comprises a square wave generator configured to generate a square-wave signal for driving an LED unit, an LLC resonance circuit configured to transform the square-wave signal outputted by the square wave generator into a sinuous wave of a reduced voltage level, and the LED unit comprising at least one LED sub-unit. The LED sub-unit comprises at least a first LED lamp set and a second LED lamp set connected in parallel, and LEDs of the first LED lamp set are disposed in a direction opposite to those of the second LED lamp set. The square wave generator, the LLC resonance circuit and the LED unit are connected in sequence.

Preferably, a plurality of said LED sub-units are disposed, and the LED sub-units are divided into at least one LED sub-unit set.

Preferably, the transformer comprises a primary winding and secondary windings, the primary winding comprises an inductor, the secondary windings comprise a plurality of induction inductors, and when a plurality of said LED sub-unit sets are disposed, the induction inductors are connected with the LED sub-unit sets in one-to-one correspondence.

Preferably, each of the LED sub-unit sets further comprises a filter capacitor which is connected in series with the LED sub-units.

Preferably, the square wave generator is one of a half-bridge inverter and a full-bridge inverter.

Preferably, the half-bridge inverter comprises a half-bridge drive integrated circuit (IC) and two switches S1, S2 connected in series, and control terminals of the switches S1, S2 are connected to the half-bridge drive IC respectively so that the switches S1, S2 are turned on and off alternately under the control of the half-bridge IC to output the square-wave signal.

Preferably, the LED drive circuit further comprises a feedback circuit for regulating the square-wave signal outputted by the square wave generator, and the feedback circuit is connected with the square wave generator.

Preferably, the feedback circuit comprises a first resistor R1, a second resistor R2, a diode D30 and an inductor L4, the inductor L4 has a terminal connected to the ground and the other terminal connected to an input terminal of the diode D30; an output terminal of the diode D30 is connected to a terminal of the first resistor R1, and the other terminal of the first resistor R1 acts as an output terminal and is connected to the square wave generator, and the second resistor R2 has a terminal connected to the output terminal and the other terminal connected to the ground.

Preferably, the LLC resonance circuit comprises a resonance capacitor Cs, a resonance inductor Ls and a transformer connected in sequence.

The present invention further provides an LED drive circuit. The LED drive circuit comprises a square wave generator configured to generate a square-wave signal for driving an LED unit, an LLC resonance circuit configured to transform the square-wave signal outputted by the square wave generator into a sinuous wave of a reduced voltage level, and the LED unit comprising at least one LED sub-unit. The LED sub-unit comprises a first LED lamp set and a second LED lamp set connected in parallel, and LEDs of the first LED lamp set being disposed in a direction opposite to those of the second LED lamp set. The square wave generator, the LLC resonance circuit and the LED unit are connected in sequence.

Preferably, the transformer comprises a primary winding and a secondary winding, the primary winding comprises an inductor, the secondary winding comprises an induction inductor, and the induction inductor and the LED sub-unit form a loop circuit.

Preferably, the LED unit comprises a plurality of LED sub-units connected in series.

Preferably, the LED unit further comprises a filter capacitor which is connected in series with the LED sub-units.

Preferably, the square wave generator is one of a half-bridge inverter and a full-bridge inverter.

Preferably, the half-bridge inverter comprises a half-bridge drive IC and two switches S1, S2 connected in series, and control terminals of the switches S1, S2 are connected to the half-bridge drive IC respectively so that the switches S1, S2 are turned on and off alternately under the control of the half-bridge IC to output the square-wave signal.

Preferably, the LED drive circuit further comprises a feedback circuit for regulating the square-wave signal outputted by the square wave generator, and the feedback circuit is connected with the square wave generator.

Preferably, the feedback circuit comprises a first resistor R1, a second resistor R2, a diode D30 and an inductor L4, the inductor L4 has a terminal connected to the ground and the other terminal connected to an input terminal of the diode D30; an output terminal of the diode D30 is connected to a terminal of the first resistor R1, and the other terminal of the first resistor R1 acts as an output terminal and is connected to the square wave generator, and the second resistor R2 has a terminal connected to the output terminal and the other terminal connected to the ground.

Preferably, the LLC resonance circuit comprises a resonance capacitor Cs, a resonance inductor Ls and a transformer connected in sequence.

Because the LED drive circuit of the present disclosure uses AC power to drive the LED unit, use of the rectifying circuit and the boost circuit is eliminated, and furthermore, even failure of one of the LEDs in the LED unit will not affect operation of other LEDs in the LED unit.

Hereinafter, implementations, functional features and advantages of the present disclosure will be further described with reference to embodiments thereof and the attached drawings.

DETAILED DESCRIPTION

It shall be understood that, the embodiments described herein are only intended to illustrate but not to limit the present disclosure.

Figure 1:
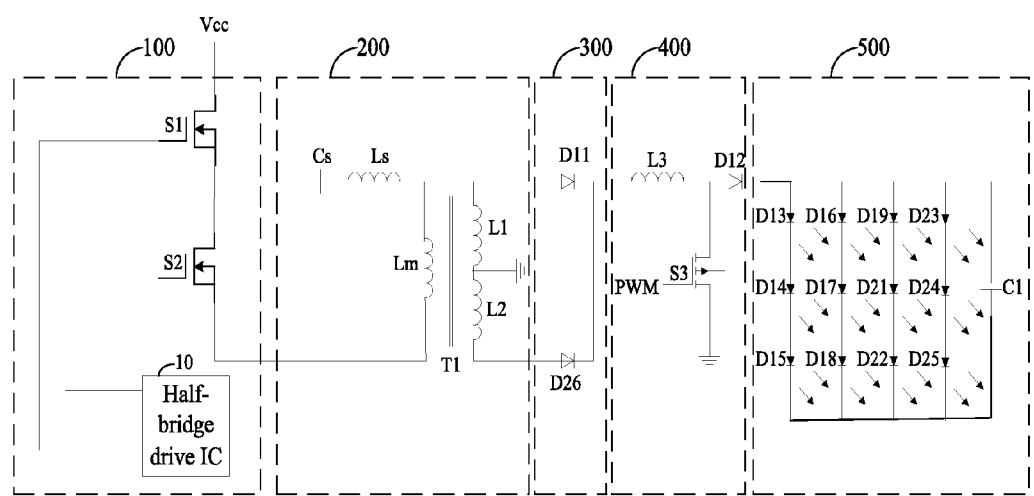
FIG. 1 is a schematic view of a prior art LED drive circuit.
Figure 2:
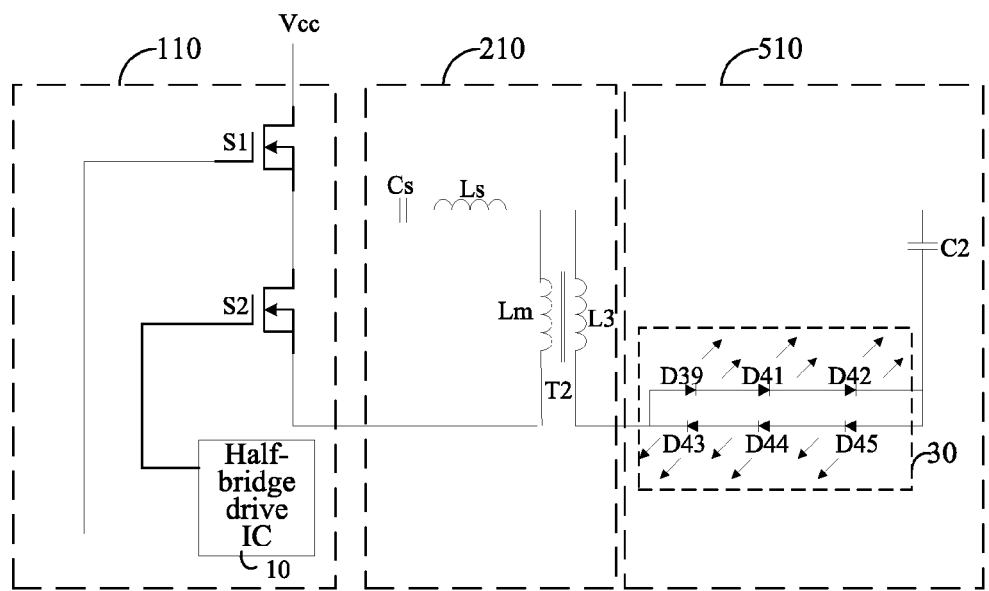
FIG. 2 is a schematic view of an embodiment of an LED drive circuit according to the present disclosure.

Referring to FIG. 2, an embodiment of an LED drive circuit of the present disclosure is disclosed, which comprises a square wave generator 110, an LLC resonance circuit 210 and an LED unit 510 connected in series. The square wave generator 110 is configured to generate a square-wave signal for driving the LED unit 510, the LLC resonance circuit 210 is configured to transform the square-wave signal outputted by the square wave generator 110 into a sinuous wave of a reduced voltage level for output to the LED unit 510, and the LED unit 510 comprises an LED sub-unit 30, the LED sub-unit 30 comprises at least a first LED lamp set and a second LED lamp set connected in parallel, and LEDs of the first LED lamp set are disposed in a direction opposite to those of the second LED lamp set.

Figure 3:
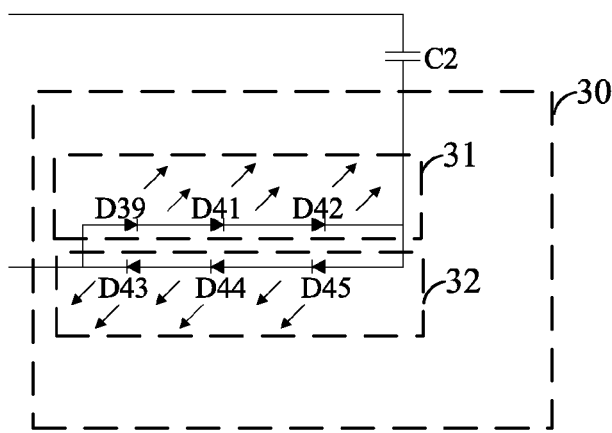
FIG. 3 is a detailed schematic view of an LED unit shown in FIG. 2.

FIG. 3 is a detailed schematic view of the LED unit 510 in the LED drive circuit shown in FIG. 2. Taking a case in which the LED unit 510 has only one LED sub-unit 30 as an example, the LED sub-unit 30 comprises at least two LED lamp sets: a first LED lamp set 31 and a second LED lamp set 32. The first LED lamp set 31 comprises one or more LEDs such as LEDs D39, D41 and D42, and the second LED lamp set 32 comprises one or more LEDs such as LEDs D43, D44 and D45. The LEDs of the first LED lamp set 31 must be disposed in a direction opposite to those of the second LED lamp set 32. The LED sub-unit 30 may also be designed to comprise more than two LED lamp sets connected in parallel depending on practical applications. Preferably, the LED unit 510 further comprises a filter capacitor C2 connected in series with the LED sub-unit 30 to filter the voltage input for purpose of passing the AC current but blocking the DC current.

The square wave generator 110 may be a half-bridge inverter or a full-bridge inverter. Taking the half-bridge inverter as an example, the half-bridge inverter comprises a half-bridge drive IC 10 and two switches S1, S2 (diodes or field effect transistors (FETs)) connected in series Taking a case in which the two switches S1, S2 are FETs as an example, gates of the two switches S1, S2 are connected to the half-bridge drive IC 10 respectively, the switch S1 has a drain connected to an input power Vcc and a source connected to a drain of the switch S2, and the drain and a source of the switch S2 form an output terminal. The two switches S1, S2 are controlled by the half-bridge drive IC 10 to be turned on or off alternately, and drive signals thereof are complementary signals having a certain duty ratio.

The LLC resonance circuit 210 is formed by a serial resonance inductor Ls, a serial resonance capacitor Cs and a transformer (which comprises inductors Lm, L3 and a magnetic core T2) connected in series, and is configured to reduce the voltage of the square-wave signal generated by the square wave generator 110. The serial resonance capacitor Cs is connected with a middle point of the switches S1, S2 of the square wave generator 110 and serves the function of passing the AC current but blocking the DC current. At the secondary side of the transformer, the induction inductor L3 is configured to output a sinuous wave signal. The square-wave signal outputted by the square wave generator 110 is modulated by the LLC resonance circuit 210 into a sinuous wave signal, and a sinuous wave voltage outputted by the induction inductor L3 can be regulated by regulating the duty ratio of the square-wave signal from the square wave generator 110.

When the LED unit 510 receives a forward voltage outputted by the induction inductor L3, the LEDs D43, D44 and D45 of the second LED lamp set 32 are turned on while the LEDs D39, D41 and D42 of the first LED lamp set 31 are turned off. When the LED unit 510 receives a reverse voltage outputted by the induction inductor L3, the LEDs D43, D44 and D45 of the second LED lamp set 32 are turned off while the LEDs D39, D41 and D42 of the first LED lamp set 31 are turned on. As the frequency of the AC current is usually equal to the driving frequency (i.e., on the order of tens of KHZ), it is impossible for people to see the switching process with the naked eye. Therefore, the AC current can also be used to drive the LED unit 510 when the rectifying diode and the boost circuit as used in the prior art are eliminated, which can save the cost.

Figure 4:
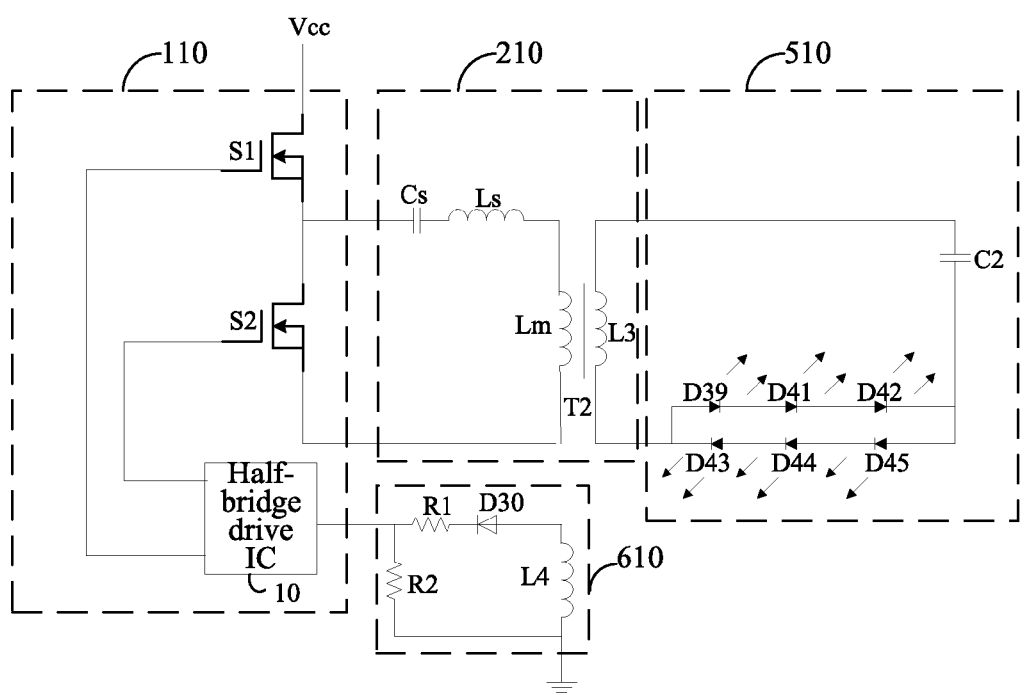
FIG. 4 is a schematic view of a second embodiment of the LED drive circuit according to the present disclosure.

As shown in FIG. 4, in order to further improve the effect of the LED drive circuit of the present disclosure, a feedback circuit 610 is disposed and connected to the half-bridge drive IC 10 of the square wave generator 110. The feedback circuit 610 comprises a first resistor R1, a diode D30, an inductor L4 and a second resistor R2. The diode D30 has an input terminal connected to the inductor L4 and an output terminal connected to the first resistor R1; the other terminal of the inductor L4 is connected to the ground, and the other terminal of the first resistor R1 is connected to the half-bridge drive IC 10 to output a feedback voltage. The second resistor R2 has a terminal connected to the output terminal and the other terminal connected to the ground. The inductor L4 feeds the output of the square wave generator 110 back to the half-bridge drive IC 10 through induction from the electric power of the parallel resonance circuit Lm so that the turn-on and turn-off times of the switches S1, S2 are regulated by the half-bridge drive IC 10. Thus, the duty ratio of the output square-wave signal and, consequently, the current outputted to the LED unit 510 can be controlled.

The present disclosure further has a variety of variations, some typical ones of which are described as follows.

Figure 5:
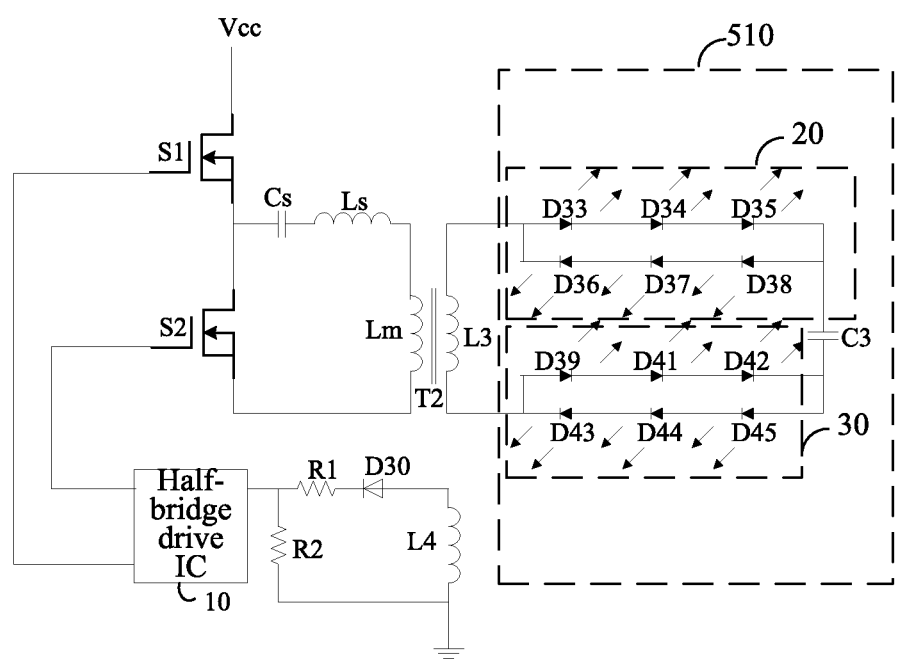
FIG. 5 is a schematic view of a third embodiment of the LED drive circuit according to the present disclosure.
Figure 6:
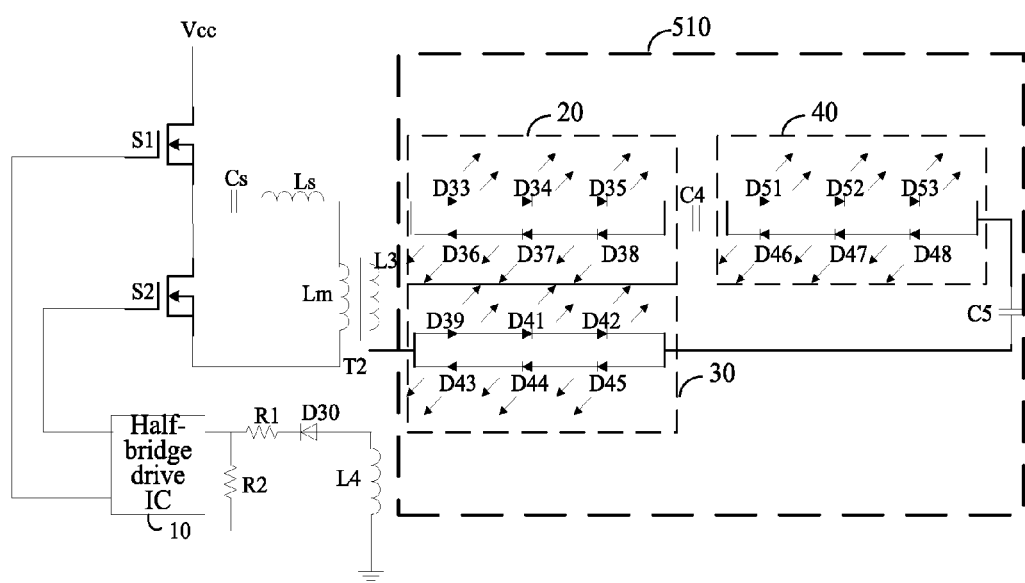
FIG. 6 is a schematic view of a fourth embodiment of the LED drive circuit according to the present disclosure.

The LED unit 510 may have two or three LED sub-units as shown in FIG. 5 or FIG. 6. Taking a case in which the LED unit 510 has two LED sub-units (i.e., a first LED sub-unit 20 and a second LED sub-unit 30) connected in series as an example, the first LED sub-unit 20 and the second LED sub-unit 30 are connected in series through a filter capacitor C3, and the first LED sub-unit 20 comprises a first LED lamp set and a second LED lamp set. In the first LED sub-unit 20, the first LED lamp set comprises one or more LEDs such as LEDs D33, D34 and D35, the second LED lamp set comprises one or more LEDs such as LEDs D36, D37 and D38, and the LEDs D33, D34 and D35 are disposed in a direction opposite to the LEDs D36, D37 and D38. In the second LED sub-unit 30, the first LED lamp set comprises one or more LEDs such as LEDs D39, D41 and D42, the second LED lamp set comprises one or more LEDs such as LEDs D43, D44 and D45, and the LEDs D39, D41 and D42 are disposed in a direction opposite to the LEDs D43, D44 and D45.

When the voltage outputted to the LED unit 510 is a forward voltage, the LEDs D33, D34 and D35 of the first LED lamp set in the first LED sub-unit 20 are turned on, and the LEDs D36, D37 and D38 of the second LED lamp set are turned off. The LEDs D39, D41 and D42 of the first LED lamp set in the second LED sub-unit 30 are turned off, and the LEDs D43, D44 and D45 of the second LED lamp set are turned on. Therefore, when the voltage is a forward voltage, the LEDs D33, D34 and D35 of the first LED sub-unit 20, the LEDs D43, D44 and D45 of the second LED sub-unit 30 and the filter capacitor C3 form a current loop circuit. Conversely, when the voltage outputted to the LED unit 510 is a reverse voltage, the LEDs D33, D34 and D35 of the first LED lamp set in the first LED sub-unit 20 are turned off, and the LEDs D36, D37 and D38 of the second LED lamp set are turned on. The LEDs D39, D41 and D42 of the first LED lamp set in the second LED sub-unit 30 are turned on, and the LEDs D43, D44 and D45 of the second LED lamp set are turned off. Therefore, when the voltage is a reverse voltage, the LEDs D36, D37 and D38 of the first LED sub-unit 20, the LEDs D39, D41 and D42 of the second LED sub-unit 30 and the filter capacitor C3 form a current loop circuit.

As shown in FIG. 6, the LED unit 510 has three or more LED sub-units. A first LED sub-unit 20 and a second LED sub-unit 30 are connected together through a filter capacitor C4, and the second LED sub-unit 30 and a third LED sub-unit 40 are connected together through a filter capacitor C5. When the induction inductor L3 outputs a forward voltage, the LEDs D33, D34, D35, D51, D52 and D53 and the LEDs D43, D44 and D45 are turned on, and when the induction inductor L3 outputs a reverse voltage, the LEDs D36, D37, D38, D46, D47 and D48 and the LEDs D39, D41 and D42 are turned on.

Figure 7:
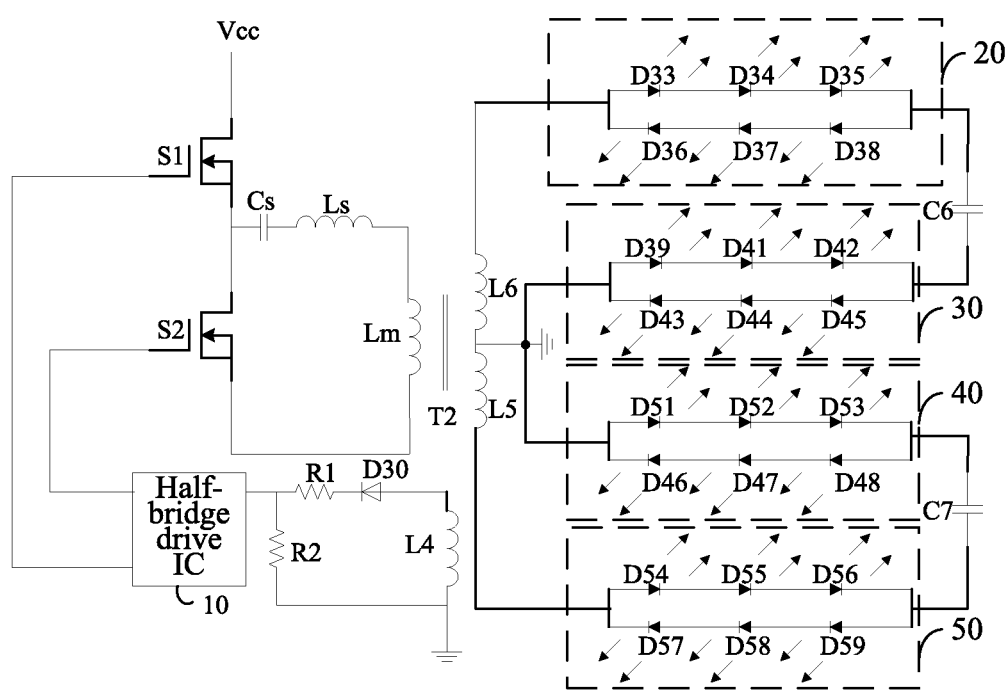
FIG. 7 is a schematic view of a fifth embodiment of the LED drive circuit according to the present disclosure.

Referring to FIG. 7, the secondary side of the transformer in the LLC resonance circuit 210 are two induction inductors L5 and L6, and a center tap of the two induction inductors L5 and L6 are connected to the ground. The induction inductor L5, a filter capacitor C7, the first LED sub-unit 20 and the second LED sub-unit 30 form a loop circuit; that is, the filter capacitor C7, the first LED sub-unit 20 and the second LED sub-unit 30 form an LED sub-unit set. The induction inductor L6, a filter capacitor C6, the third LED sub-unit 40 and a fourth LED sub-unit 50 form another loop circuit; that is, the filter capacitor C6, the third LED sub-unit 40 and the fourth LED sub-unit 50 form another LED sub-unit set. When the LED unit 510 receives a forward voltage, the LEDs D33, D34, D35, D43, D44 and D45 and the LEDs D51, D52, D53, D57, D58 and D59 are turned on, and when the LED unit 510 receives a reverse voltage, the LEDs D36, D37, D38, D39, D41 and D42 and the LEDs D54, D55, D56, D46, D47 and D48 are turned on.

The present disclosure is not limited to the aforesaid embodiments, and other variant embodiments made by people skilled in the art according to the above descriptions are also covered in the present disclosure.

What described above are only preferred embodiments of the present disclosure but are not intended to limit the scope of the present disclosure. Accordingly, any equivalent structural or process flow modifications that are made on basis of the specification and the attached drawings or any direct or indirect applications in other technical fields shall also fall within the scope of the present disclosure.

What is claimed is:

1. A light emitting diode (LED) drive circuit, comprising: a square wave generator configured to generate a square-wave signal for driving an LED unit; an LLC resonance circuit configured to transform the square-wave signal outputted by the square wave generator into a sinuous wave of a reduced voltage level; the LED unit comprising a plurality of LED sub-units; each of the LED sub-units comprising at least a first LED lamp set and a second LED lamp set connected in parallel; and LEDs of the first LED lamp set being disposed in a direction opposite to those of the second LED lamp set; the square wave generator, the LLC resonance circuit and the LED unit are connected in sequence;

wherein the LED sub-units are divided into a plurality of LED sub-unit sets; and the LLC resonance circuit comprises a primary winding and secondary windings; the primary winding comprises an inductor; the secondary windings comprise a plurality of induction inductors; and the induction inductors are connected with the LED sub-unit sets in one-to-one correspondence.

2. The LED drive circuit of claim 1, wherein each of the LED sub-unit sets further comprises a filter capacitor which is connected in series with the LED sub-units.

3. The LED drive circuit of claim 1, wherein the square wave generator is one of a half-bridge inverter and a full-bridge inverter.

4. The LED drive circuit of claim 3, wherein the half-bridge inverter comprises a half-bridge drive integrated circuit (IC) and two switches S1, S2 connected in series, and control terminals of the switches S1, S2 are connected to the half-bridge drive IC respectively so that the switches S1, S2 are turned on and off alternately under the control of the half-bridge IC to output the square-wave signal.

5. The LED drive circuit of claim 1, further comprising a feedback circuit for regulating the square-wave signal outputted by the square wave generator, and the feedback circuit is connected with the square wave generator.

6. The LED drive circuit of claim 5, wherein the feedback circuit comprises a first resistor R1, a second resistor R2, a diode D30 and an inductor L4, the inductor L4 has a terminal directly connected to the ground and the other terminal connected to an input terminal of the diode D30; an output terminal of the diode D30 is connected to a terminal of the first resistor R1, and the other terminal of the first resistor R1 acts as an output terminal and is connected to the square wave generator, and the second resistor R2 has a terminal connected to the output terminal and the other terminal connected to the ground.

7. The LED drive circuit of claim 1, wherein the LLC resonance circuit comprises a resonance capacitor Cs, a resonance inductor Ls and a transformer connected in sequence.

8. An LED drive circuit, comprising: a square wave generator configured to generate a square-wave signal for driving an LED unit; an LLC resonance circuit configured to transform the square-wave signal outputted by the square wave generator into a sinuous wave of a reduced voltage level; the LED unit comprising a plurality of LED sub-units; each of the LED sub-units comprising a first LED lamp set and a second LED lamp set connected in parallel; and LEDs of the first LED lamp set being disposed in a direction opposite to those of the second LED lamp set; the square wave generator, the LLC resonance circuit and the LED unit are connected in sequence;
wherein the LED sub-units are divided into a plurality of LED sub-unit sets; and the LLC resonance circuit comprises a primary winding and secondary windings; the primary winding comprises an inductor; the secondary windings comprise a plurality of induction inductors; and the induction inductors are connected with the LED sub-unit sets in one-to-one correspondence.

9. The LED drive circuit of claim 8, wherein each of the induction inductors and the corresponding LED sub-unit set form a loop circuit.

10. The LED drive circuit of claim 9, wherein the LED unit comprises a plurality of the LED sub-units connected in series.

11. The LED drive circuit of claim 8, wherein the LED unit further comprises a filter capacitor which is connected in series with the LED sub-units.

12. The LED drive circuit of claim 8, wherein the square wave generator is one of a half-bridge inverter and a full-bridge inverter.

13. The LED drive circuit of claim 12, wherein the half-bridge inverter comprises a half-bridge drive IC and two switches S1, S2 connected in series, and control terminals of the switches S1, S2 are connected to the half-bridge drive IC respectively so that the switches S1, S2 are turned on and off alternately under the control of the half-bridge IC to output the square-wave signal.

14. The LED drive circuit of claim 8, further comprising a feedback circuit for regulating the square-wave signal outputted by the square wave generator, and the feedback circuit is connected with the square wave generator.

15. The LED drive circuit of claim 14, wherein the feedback circuit comprises a first resistor R1, a second resistor R2, a diode D30 and an inductor L4, the inductor L4 has a terminal connected to the ground and the other terminal connected to an input terminal of the diode D30; an output terminal of the diode D30 is connected to a terminal of the first resistor R1, and the other terminal of the first resistor R1 acts as an output terminal and is connected to the square wave generator, and the second resistor R2 has a terminal connected to the output terminal and the other terminal connected to the ground.

16. The LED drive circuit of claim 8, wherein the LLC resonance circuit comprises a resonance capacitor Cs, a resonance inductor Ls and a transformer connected in sequence.

* * * * *